Dec. 4, 1951     O. J. ALVAREZ     2,577,100
HYDRAULIC SCALE

Filed July 19, 1946     5 Sheets-Sheet 1

Dec. 4, 1951  O. J. ALVAREZ  2,577,100
HYDRAULIC SCALE

Filed July 19, 1946  5 Sheets-Sheet 2

INVENTOR.
Octavio Jose Alvarez
BY

Dec. 4, 1951     O. J. ALVAREZ     2,577,100
HYDRAULIC SCALE Filed July 19, 1946     5 Sheets-Sheet 3

INVENTOR.

Dec. 4, 1951 O. J. ALVAREZ 2,577,100
HYDRAULIC SCALE

Filed July 19, 1946 5 Sheets-Sheet 4

INVENTOR.
Octavio Jose Alvarez
BY

Dec. 4, 1951  O. J. ALVAREZ  2,577,100
HYDRAULIC SCALE

Filed July 19, 1946  5 Sheets-Sheet 5

INVENTOR.
Octavio Jose Alvarez
BY

Patented Dec. 4, 1951

2,577,100

UNITED STATES PATENT OFFICE 2,577,100

HYDRAULIC SCALE

Octavio Jose Alvarez, New York, N. Y., assignor to Alvarez Patent Corporation, New York, N. Y.

Application July 19, 1946, Serial No. 684,918

13 Claims. (Cl. 265—47)

My present invention relates to hydraulic scales.

It is an object of this invention to provide a hydraulic scale without any movable mechanical parts.

It is a further object of this invention to provide a compact scale which is very simple in construction, easy to manufacture and reliable in use.

It is another object of my invention to provide a scale which can be used for very small loads as well as for very heavy loads and is equally accurate for loads of what ever type.

It is still a further object of my present invention to provide a hydraulic scale without any metallic parts which have to be bent to obtain the desired weight indications.

With the above objects in view, my new hydraulic scale mainly comprises a closed compressible receptable forming a closed chamber, an indicating tube being closed at one end and secured at its other end to the above mentioned closed compressible receptable communicating with the closed chamber within the same, a fluid substance arranged in this chamber within the receptacle and reaching into the above mentioned indicating tube partly filling the same, and a gaseous substance arranged within the remaining part of this indicating tube near the closed end of the same.

In accordance with a preferred embodiment of my present invention, the fluid substance in the closed chamber completely fills the same leaving no free space above the fluid surface.

However, it should be stressed that it is also possible to arrange the fluid substance so that the same is only partly filling the closed chamber and a cushion of gaseous substance fills the space above the fluid substance in the closed chamber within the closed compressible receptacle described above.

In order to obtain proper communication between the indicating tube mentioned above and the compressible receptacle, I provide in one of the walls of the latter a small hole and arrange the indicating tube so that it communicates with the closed chamber within the receptacle through this hole. This hole is preferably arranged in the side or top wall of the receptacle described above.

A weighing scale of the above described type operates by using the weight of the object to be weighed to compress the compressible receptacle and thus reduce the volume of the closed chamber within the same. This can be done by using the top wall of the receptacle as scale platform and placing the objects to be weighed on this platform.

By compressing the receptacle and reducing the volume of the chamber within the same, pressure will be exerted on the fluid substance in this chamber and fluid will be forced into the indicating tube compressing the gaseous substance arranged near and at the closed end of the same. The degree of compression and the change of volume of the gaseous substance caused by the compression will be an indication of the degree of compression of the closed compressible receptacle of the scale; the degree of compression of the receptacle in turn is an indication of the weight of the object placed on the top of it; thus, it is evident that the degree of decrease of volume of the gaseous substance within the indicating tube will be an indication of the weight of the object placed on top of the receptacle, i. e. an indication of the weight of the object to be weighed.

Thus, by providing proper graduations on the indicating tube itself or on an indicating scale combined with the indicating tube, it is possible to obtain with a weighing scale of the above described type accurate indication of the weight of various objects placed on the scale platform.

I wish to stress that the variation of the volume of the gaseous substance in the indicating tube will not be directly proportional to the variations of the load to be weighed, but vary in logarithmic proportion therewith. Thus, it is evident that a scale of this type can very well be used and will give exact weight indications for small loads as well as heavy loads.

In order to adjust the zero point of my new weighing scale, i. e. in order to adjust the level of the indicating fluid substance in the indicating tube so as to conform to the zero indication on the indicating scale combined with the tube, I provide means for varying the volume of the indicating tube, particularly for varying the volume of that part of the indicating tube which is filled with the gaseous substance as set forth above. For this purpose it is advisable to make the indicating tube of a slightly resilient material and to provide means for compressing the upper end of the tube, thereby reducing, whenever desired, the volume of the same.

A particularly preferred and very simple embodiment of my scale consists of a closed compressible receptacle having a flat horizontal bottom wall serving as support, a flat horizontal top wall serving as scale platform, a side wall connecting the bottom wall with the top wall and a graduated indicating tube connected with the receptacle preferably the top or side wall thereof, communicating with the closed chamber formed by this receptacle as described above.

I have found it advantageous to provide a scale of the type set forth in the preceding paragraph with non-compressible bottom and top walls and compressible side wall or walls secured along their edges to the edges of the non-compressible top and bottom walls. A scale of this type is of particularly simple construction since the non-compressible top wall can be used as scale platform and the non-compressible bottom wall can be used as support while the compressible side walls serve for obtaining the necessary compression and reduction of volume of the chamber within the receptacle. Of course, these side walls have to be resilient so that they resume their original position and shape after removal of the load to be weighed from the top of the receptacle.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

In accordance with my present invention, the weighing scale shown in Figs. 1 to 7 inclusive comprises as main elements a closed receptacle 20 being provided with a hole 21 at its bottom. The indicating tube 22 is firmly secured to this compressible receptacle 20 at the bottom thereof so as to communicate through hole 21 with the closed chamber 23 formed by the receptacle 20.

Figure 1:
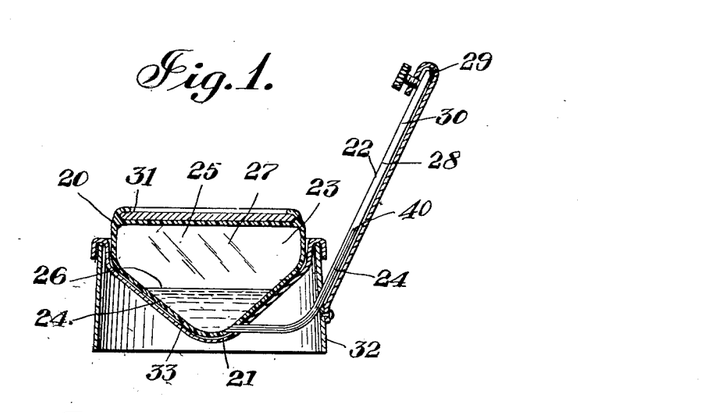
Fig. 1 is a cross section through an embodiment of my new weighing scale.
Figures 2, 3, 4, 5, 6, 7:
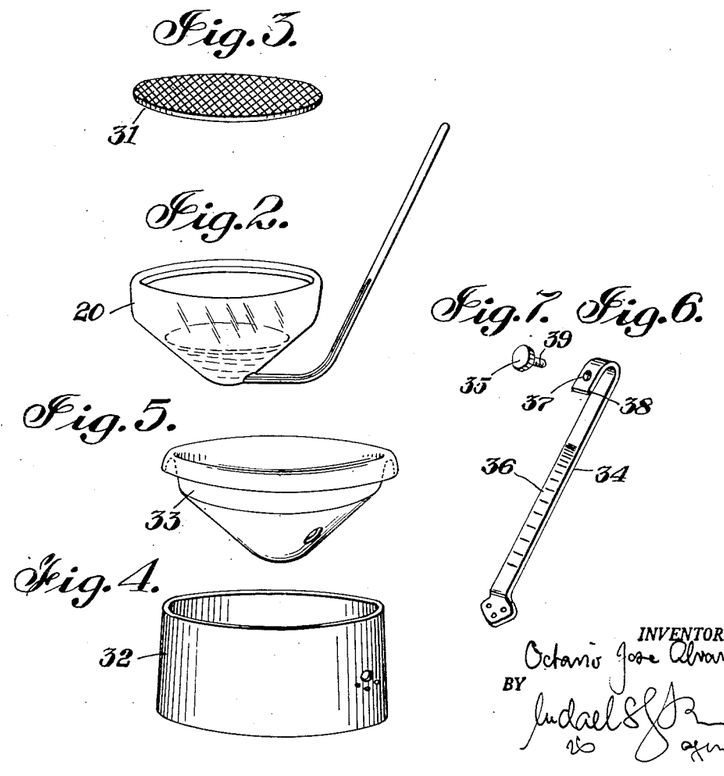
Fig. 2 is a perspective view of the compressible receptacle forming part of the scale shown in Fig. 1.
Fig. 3 is a perspective view of the scale platform, forming also part of the scale shown in Fig. 1.
Fig. 4 is a perspective view of the base forming also part of the scale shown in Fig. 1.
Fig. 5 is a perspective view of the supporting member forming also part of the scale shown in Fig. 1.
Fig. 6 is a perspective view of the graduating indicating scale forming also part of the scale shown in Fig. 1.
Fig. 7 is a perspective view of the adjusting screw forming also part of the scale shown in Fig. 1.

This receptacle 20 is preferably made of a flexible material like rubber or a flexible plastic. Similarly, the indicating tube might consist also of rubber or plastic; however, it is important that this indicating tube be transparent so as to enable observation of the indicating liquid 24 within the same. This indicating liquid 24 is partly filling, as shown in Figs. 1 and 2, the closed chamber 23 within the receptacle 20 and reaching through hole 21 into the indicating tube 22 partly filling the same.

The space 25 above the liquid surface 26 is filled with a gaseous substance 27 forming a gas, preferably air cushion. The space 28 between the indicating liquid 24 in the indicating tube 22 and the closed end 29 of this tube is also filled with a gaseous substance 30, e. g. air.

I wish to stress that I might use as gaseous substance for filling the space 25 within the receptacle 20 and the space 28 within the indicating tube 22, not only air, but also other compressible gases, as for instance, helium and other gases which do not combine or react with the fluid substance used in the scale.

As fluid substance I might employ, depending upon the use of the scale, various liquids, e. g. water, alcohol, or the like. However, I wish to stress that I might use also mercury, if desired.

The scale shown in Fig. 1 and described above consists of the parts singly shown in Figs. 2 to 7, namely of the receptacle 20 described above and clearly shown in Fig. 2; the scale platform 31 shown in Fig. 3; the base 32 shown in Fig. 4; the supporting member 33 shown in Fig. 5; the graduated supporting member 34 shown in Fig. 6; and the adjusting screw 35 shown in Fig. 7.

I wish to stress that in the above described embodiment of my invention the compressible receptacle 20 consists of relatively highly flexible material and thus such a receptacle would not be self-supporting without support 33 having the same shape as the receptacle itself.

As shown in Fig. 6, the logarithmic indicating scale 36 for indicating the volume variations of the gaseous substance 30 in the indicating tube 22 is arranged on the supporting scale member 34. This scale member is used simultaneously as support for the adjusting screw 35 which engages a screw threaded hole 37 in the bent top portion 38 of member 34. As shown in Fig. 7, the tip 39 of screw 35 presses against the wall of the indicating tube 22, enabling compression of the indicating tube and thus adjustment of the position of the liquid surface 40 of the indicating liquid 24 within the indicating tube 22.

The above described weighing scale operates as follows:

The object to be weighed is placed on the scale platform 31. This results in compression of receptacle 20 and reduction of the volume of chamber 23 within the same. This in turn causes the fluid substance 24 to be forced through hole 21 into the indicating tube 22 which results in compression of the gaseous substance 30 and movement of the liquid surface 40 of liquid 24 toward the closed end 29 of tube 22. It is evident that the degree of this movement will be proportional to the weight of the object placed on the platform 31 and thus, it will be possible to read this weight on the indicating scale 36 if the same is properly calibrated.

All scales shown in Figs. 8 to 15 inclusive operate on the same basic principle and comprise the same basic elements as the scale shown in Figs. 1 to 7 inclusive and described above. Therefore, I will describe in detail only those parts of the scales shown in Figs. 8 to 15 which differ from the corresponding parts of the scales shown in Figs. 1 to 7.

Figures 8, 9:
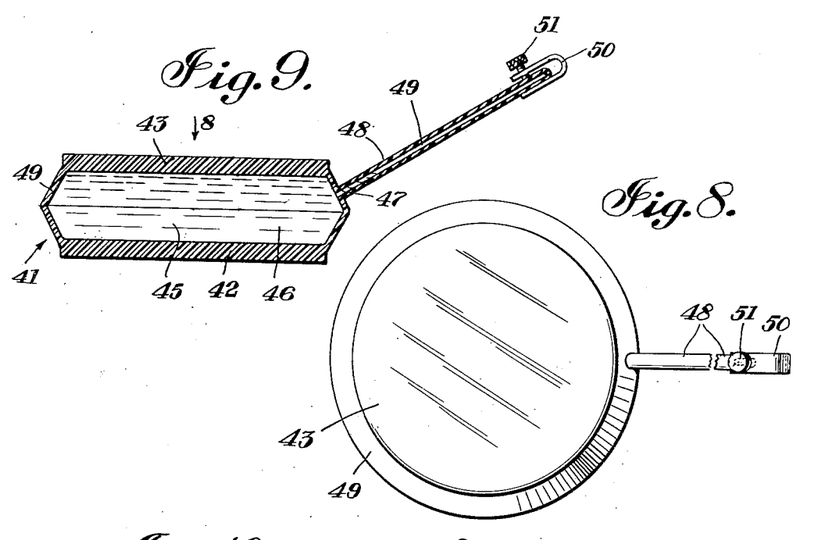
Fig. 8 is a top view of another embodiment of my new weighing scale seen in direction of arrow 8 on Fig. 9.
Fig. 9 is a cross section through the weighing scale shown in Fig. 8.

The scale shown in Figs. 8 and 9 consists of a receptacle 41 having a non-compressible relatively thick bottom wall 42, serving as support, a relatively thick top wall 43, serving as scale platform, and a compressible side wall 44 serving as compression element of the scale.

The chamber 45 formed by this receptacle is completely filled with liquid 46 which reaches through hole 47 also as shown into the indicating tube 48. The upper portion of this tube is filled with air 49 or another gaseous substance.

In order to adjust the volume of the air space, I provide a clamp member 50 which is provided with a screw 51 pressing directly against the upper end of the indicating tube 48 as shown.

A scale of the type as shown in Figs. 8 and 9 and described above has the great advantage that it is very simple since it does not need any separate base, separate scale platform, separate receptacle support and separate graduated scale support for the indicating tube 48. It can be made out of one piece of plastic or similar resilient substance.

Figures 10, 11:
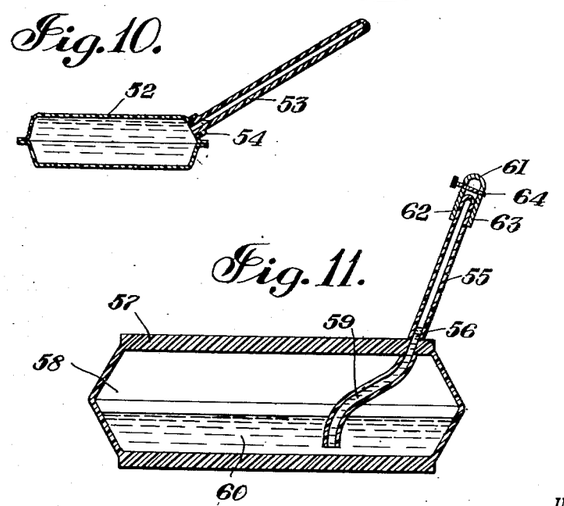
Fig. 10 is a cross section through a modified embodiment of the weighing scale shown in Figs. 8 and 9.
Fig. 11 is a cross section through another modified embodiment of the weighing scale shown in Figs. 8 and 9.

The scale shown in Fig. 10 is very similar to the one shown in Figs. 8 and 9; the only difference is that the receptacle 52 consists of sheet metal and the transparent indicating tube 53 is screwed thereto at 54 as shown.

The scale shown in Fig. 11 differs from the scale shown in Figs. 8 and 9 mainly in that the indicating tube 55 forming part of the scale shown in Fig. 11 passes through a hole 56 in the top wall 57 of receptacle 58 and has an extension 59 reaching into the liquid 60 partly filling the receptacle 58, while the indicating tube 48 forming part of the scale shown in Figs. 8 and 9 is connected to the side walls of the scale as shown and does not reach into the receptacle.

In combination with the scale shown in Fig. 11, I have shown a slightly different adjusting member which consists of a clamp 61 provided with two prongs 62 and 63 pressing against the indicating tube 55. The pressure of this clamp 61 might be adjusted in well known manner by the adjusting screw 64.

Figures 12, 13, 14:
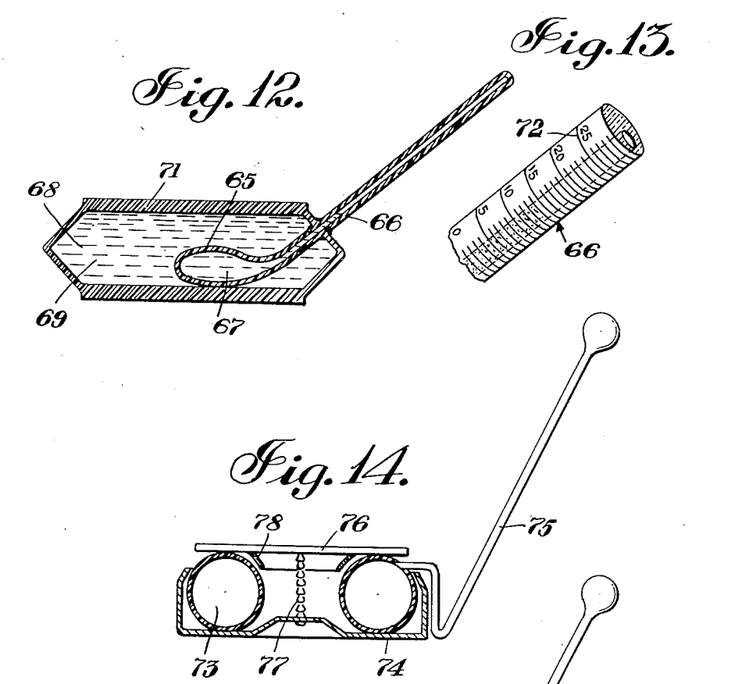
Fig. 12 is a cross section through still another modified embodiment of the weighing scale shown in Figs. 8 and 9.
Fig. 13 is a partial perspective view of an indicating tube provided with graduations.
Fig. 14 is a cross section through a weighing scale differing in certain respects from all weighing scales shown in the preceding figures.

The scale shown in Fig. 12 consists of a compressible receptacle 65 shaped as shown and connected with the indicating tube 66. This receptacle is entirely filled with a liquid 67 reaching also into the indicating tube 66. The characteristic feature of this scale is that the receptacle 65 is not mechanically compressed by the object to be weighed, but that the entire receptacle 65 is arranged within an entirely closed compression chamber 68 filled with a liquid substance 69. This compression chamber is formed by an entirely closed compressible container 70 having a shape being similar to the shape of the compressible receptacle 43 of the scale shown in Figs. 8 and 9.

This scale is operated by placing the object to be weighed on the top wall 71 of the compressible container 70; thereby the air or other gaseous substance 69 in chamber 68 is compressed and exerts pressure on the compressible walls of receptacle 65, pressing the indicating liquid 67 into the indicating tube 66 as described above.

The indicating tube of the scales shown in Figs. 9 to 12 might have the shape and appearance shown in Fig. 13, i. e. have an elliptical cross section and be provided with graduations 72 directly engraved or printed on the plastic material of which the tube consists.

In Fig. 14 I have shown a scale in which the compressible receptacle consists of a tubular compressible member 73 supported by base 74 and connected with an indicating tube 75. The scale platform 76 rests on the tubular member 73 and is prevented from sliding off by chain 77 and the conical projecting wall 78 forming part of the platform 76.

Figure 15:
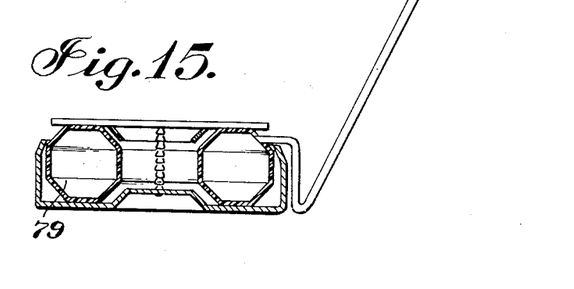
Fig. 15 is a cross section through a modified embodiment of the weighing scale shown in Fig. 14.

The scale shown in Fig. 15 differs from the scale shown in Fig. 14 only in the shape of the tubular compressible member; while the tubular member 73 of the scale shown in Fig. 14 has a circular projection, the tubular member 79 of the scale shown in Fig. 15 has an octagonal cross section. This is important in order to avoid variations in the supporting surface of the tubular member which variations might interfere with obtaining proper weight indications.

I have found that temperature variations of the air surrounding the scale result in variations of the temperature of the gaseous substance within the indicating tube, which in turn result in volume variations of this gaseous substance. Such variations of the volume of air in the indicating tube cause, of course, certain inaccuracies of the scale indications.

Furthermore, I have found that with an indicating tube of the type shown in the above described figures relatively great variations of pressure have a relatively small effect on the position of the water level within the tube. This means that even relatively great changes in weight result progressively only in small changes of the water level.

Figure 16:
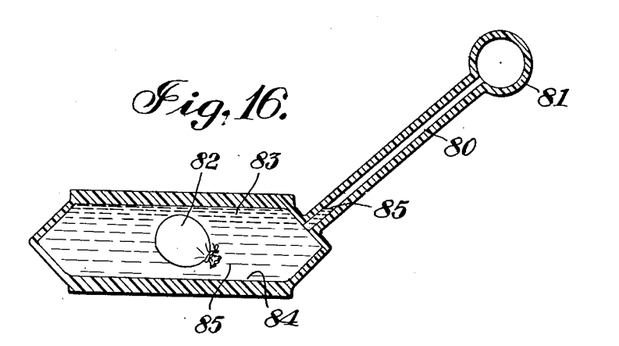
Fig. 16 is a cross section through a weighing scale similar to the one shown in Fig. 10, provided with compensating means.

In order to overcome the last mentioned disadvantage, I have found it advisable to provide, as shown in Fig. 16, at the end of the indicating tube 80 a closed container 81 communicating with tube 80. In this way it is possible to increase the volume of gaseous substance, e. g. air, and thus increase the compressibility of the same; this results in greater variations of the liquid level.

However, use of an additional closed container 81 and increase of the volume of the gaseous substance results in increased expansion and contraction of the same due to temperature variations. In order to compensate for such variations in the volume of the gaseous substance contained in tube 80 and the closed container 81, I provide within the fluid 83 in receptacle 84 a separate closed container 82 consisting of a compressible and expandable material. The size of this separate closed container 82 has to be chosen so that the volume of the gaseous substance contained in this container is equal to the volume of the gaseous substance contained in tube 80 and container 81.

This compensating arrangement operates as follows: If the temperature rises, the gas contained in tube 80 and container 81 tends to expand and presses against the water surface 85. Simultaneously, however, the gas within the compressible expandable separate container 82 expands too and forces the water 85 from receptacle 84 into tube 80. The increase of pressure with which the water is forced into tube 80 is equal to the increase of pressure with which the gas within tube 80 presses against the water level 85. Thus, this water level remains unchanged, despite variations in temperature of the air surrounding the scale.

Figure 17:
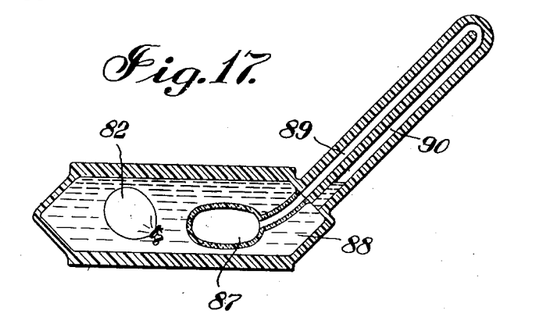
Fig. 17 is a cross section through a modified weighing scale, similar to the scale shown in Fig. 16.

In Fig. 17 I have shown a scale provided with compensating means similar to the one shown in Fig. 16. The only difference is that instead of an additional gas container 81 of the type shown in Fig. 16, I use an additional gas container 87 which is arranged within receptacle 88 and connected by return tube 89 with the indicating tube 90.

I wish to note that it is of great importance that the additional gas containers 81 and 87 shown in Figs. 16 and 17, respectively, should be non-compressible and non-expandable; contrary thereto, the separate gas container 82 has to consist of a relatively easily stretchable and expandable material, e. g. a thin rubber sheet or the like.

Figure 18:
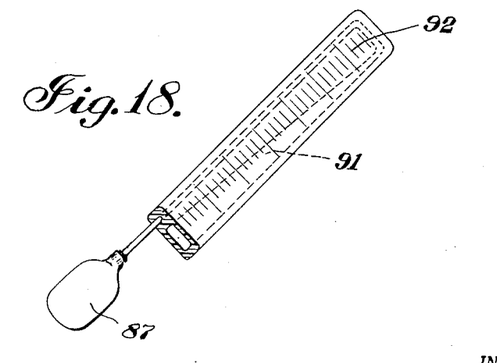
Fig. 18 is a partial perspective view of a modified indicating tube adapted to be used in combination with the weighing scales shown in Figs. 16 and 17.

I have also found that in order to avoid use of a logarithmic scale on the indicating tube, it is advisable to shape this tube as shown in Fig. 18. In this figure the indicating tube 91 itself has a logarithmic shape, i. e. has a logarithmically decreasing cross section, so that the indicating marks 92 on this tube might be equally spaced as shown.

In Figs. 1, 6, 7, 8, 9, and 11 I have shown means for adjusting the volume of the gas filled portion of the indicating tube. I have found that in certain instances, particularly in the event of substantial temperature variations, such means are insufficient to fully compensate for temperature variations. This is particularly true if I provide not only a tubular member but arrange at the end thereof an additional gas container. In such cases, the volume variations of the air cannot be compensated by compressing the tube itself.

Figures 19, 20, 21, 22, 23:
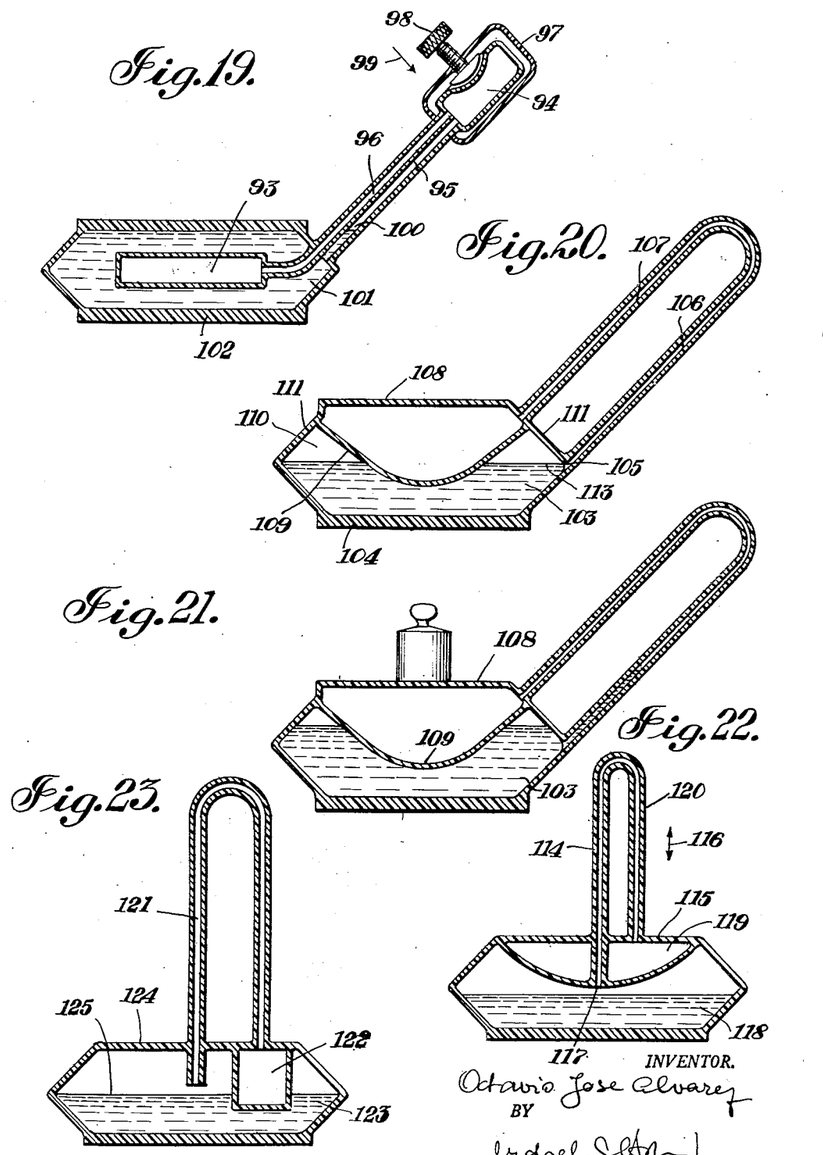
Fig. 19 is a cross section through a weighing scale according to my present invention provided with adjusting means of special type.
Fig. 20 is a cross section through a modified embodiment of my new weighing scale provided with mechanical means for displacing the fluid, in inoperative position.
Fig. 21 is a cross section through the weighing scale shown in Fig .20, in operative position.
Fig. 22 is a cross section through a weighing scale similar to the one shown in Figs. 20 and 21.
Fig. 23 is a modified embodiment of the weighing scale shown in Fig. 22.

In order to overcome this disadvantage, I propose to provide, as shown in Fig. 19, in addition to the rigid non-compressible gas container 93 a non-rigid compressible gas container 94 combined with the indicating tube 95 and the return tube 96. This non-rigid compressible gas container 94 is arranged in a casing 97 and an adjusting screw 98 passes through the wall of the casing 97; the screw 98 is adapted to be moved in direction of arrow 99 so as to compress the gas container 94 and reduce its volume, whenever desired.

The adjusting means described in the preceding paragraph is operated in the following way: If the temperature of the air surrounding the weighing scale rises, the gas contained in the tubes 95, 96 and the containers 93 and 94 expands and exerts pressure upon the level 100 of fluid 101 contained in the compressible receptacle 102, tending to force the fluid in the indicating tube 95 downward. In order to compensate for this increased pressure, the screw 98 is turned so as to increase the space within container 94 thereby enabling expansion of the gas without increase of pressure. If the temperature decreases, the gas pressure decreases too; in such event, in order to keep the pressure constant, the screw 98 is moved in direction of arrow 99 so as to compress the gas filled space and to keep the pressure exerted by the gas constant.

The scale shown in Figs. 20 and 21 is built so as to keep the level of the liquid 103 in the compressible receptacle 104 independent of changes of the gas pressure caused by expansion or contraction of the gas. For this purpose, the compressible receptacle 104 is only partially filled with the indicating fluid 103 so that the level 113 of the fluid is just below the entrance opening 105 of the indicating tube 106. This indicating tube is connected by the return tube 107 with a rigid gas container 108 which is shaped so that its lower wall 109 immerses into fluid 103 as shown in Fig. 20, or is at a slight distance therefrom, when the scale is in inoperative position. It is evident that in a scale of this type the fluid level 113 of the fluid 103 will not vary by changes of the pressure of the gas filling the space 110 above the fluid 103 in receptacle 104. The only effect caused by pressure variations of the gas will be expansion or contraction of the flexible walls 111 of receptacle 104. The pressure of the gas in the container 108 will oppose any change caused by a pressure change in the space 110 and, therefore, the volume of the container 108 and the space 110 must be equal to cause the level 113 to remain constant with a temperature change. Thus, these pressure variations will not cause rise or fall of the fluid level within the indicating tube 106.

If a weight is placed on the platform 108 of the scale of Fig. 20 as shown in Fig. 21, its lower wall 109 will be forced deeper into fluid 103 and displace the same so that this fluid will rise in receptacle 104, closing the entrance opening 105 of the indicating tube 106 and then rising in this tube itself proportionate to the weight placed on platform 112 as shown in Fig. 21.

Thus, the fluid will have a valve like action, i. e. if there is no load on platform 112, the entrance opening 105 of the indicating tube 106 will be open as shown in Fig. 20, and if a load is placed on this platform as shown in Fig. 21, the entrance opening will be closed by the rising fluid.

While I have shown in Figs. 20 and 21 a scale wherein the fluid is displaced and thereby causes the closing of the entrance opening 105 of the indicating tube 106, in the scale shown in Fig. 22, the indicating tube 114 moves together with the weighing platform 115 in direction of arrows 116. Thus, if a load is placed on platform 115 the entire platform together with the indicating tube 114 is forced downward so that the entrance opening 117 of the indicating tube 114 immerses into fluid 118 causing this opening to be closed and the fluid to rise in tube 114. The additional gas receptacle 119 is connected with the indicating tube 114 by means of return tube 120 in the way described above in connection with the scale shown in Figs. 20 and 21.

In the scale shown in Fig. 23 the indicating tube 121 is arranged in the same way as the indicating tube 120 shown in Fig. 22. The only difference is that the additional gas receptacle 122 permanently immerses into fluid 123. In a scale of this type placing of a load on platform 124 causes not only movement of this platform toward the surface 125 of fluid 123, but also raising of this surface due to displacement of the fluid by the additional gas container 122.

It will be understood that each of the elements described above, or two or more together, may also find a useful application in other types of weighing scales differing from the types described above.

While I have illustrated and described the invention as embodied in hydraulic weighing scales, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A hydraulic scale comprising a closed compressible receptacle forming a closed chamber; a weight indicating tube being closed at one end and secured at its other end to said closed compressible receptacle communicating with said closed chamber within the receptacle; a fluid substance in said closed chamber within said closed compressible receptacle filling said closed chamber and reaching into said indicating tube partly filling the same; a first quantity of a gaseous substance arranged within the unfilled part of said indicating tube near the said closed end of the same; a compressible expandable container within said closed compressible receptacle; and a second quantity of said gaseous substance arranged in said compressible expandable container, said compressible expandable container having the same volume as the said unfilled part of said indicating tube when said expandable container is filled with said second quantity of said gaseous substance.

2. A hydraulic scale comprising a closed compressible receptacle forming a closed chamber; a weight indicating tube secured at its one end to said closed compressible receptacle communicating with said closed chamber within the receptacle; a closed container arranged at the other end of said indicating tube communicating with the space within the same; a fluid substance arranged in said closed chamber within said closed compressible receptacle and reaching into said indicating tube partly filling the same; the first quantity of a gaseous substance within said indicating tube and said closed container filling the unfilled space in said indicating tube and said closed container; a compressible expandable container within said closed compressible receptacle; and the second quantity of said gaseous substance arranged in said compressible expandable container, said compressible expandable container having the same volume as the said unfilled part of said indicating tube when said expandable container is filled with said second quantity of said gaseous substance.

3. A hydraulic scale comprising a closed compressible receptacle forming a closed chamber; a base supporting said closed compressible receptacle; a scale platform supported in horizontal position by said closed compressible receptacle; a side wall forming part of said closed compressible receptacle; a weight graduated indicating tube secured at one end to said side wall of said compressible receptacle communicating with said closed chamber within said compressible receptacle; a liquid in said closed compressible receptacle partly filling said closed chamber within the receptacle so that the level of said liquid at no load is slightly under said one end of said tube secured to said side wall of said compressible receptacle; a hollow displacing member connected with the other end of said graduated indicating tube and combined with said scale platform so as to be adapted to immerse into said liquid in said closed compressible receptacle so as to displace the liquid when said scale platform is moved downward, raising the level of said liquid, closing thereby said first end of said graduated indicating tube and forcing said liquid to rise in said graduated indicating tube; a gaseous substance filling the space above the liquid level of said liquid within said closed chamber; and a gaseous substance within said graduated indicating tube and said hollow displacing member filling those portions of the same which are not filled by said liquid.

4. A hydraulic scale comprising a closed compressible receptacle forming a closed chamber; a base supporting said closed compressible receptacle; a scale platform supported in horizontal position by said closed compressible receptacle; a side wall forming part of said closed compressible receptacle; a weight graduated indicating tube being secured at one end to said side wall of said compressible receptacle communicating with said closed chamber within said compressible receptacle; a liquid in said closed compressible receptacle partly filling said closed chamber within the receptacle so that the level of said liquid at no load is slightly under said one end of said tube secured to said side wall of said compressible receptacle; a non-compressible additional air container arranged under said scale platform and connected with the other end of said graduated indicating tube and arranged so as to be adapted to immerse into said liquid in said closed compressible receptacle so as to displace the liquids when said scale platform is moved downward, raising the level of said liquid, closing thereby said one end of said graduated indicating tube and forcing said liquid to rise in said graduated indicating tube; a gaseous substance filling the space above the liquid level of said liquid within said closed chamber; and a gaseous substance filling said additional gas container and that portion of said graduated indicating tube which is not filled by said liquid.

5. A hydraulic scale comprising a closed compressible receptacle forming a closed chamber; a flat horizontal bottom wall forming part of said closed compressible receptacle and serving as support for the same; a flat horizontal top wall forming part of said closed compressible receptacle and serving as scale platform; a compressible side wall extending between said bottom wall and said top wall; a weight graduated indicating tube being secured at one end to said compressible receptacle communicating with said closed chamber within the receptacle; a fluid substance arranged within said closed compressible receptacle partly filling said closed chamber within the same so that the level of said fluid substance at no load is slightly under said one end of said tube secured to said side wall of said compressible receptacle; and a displacing member combined with said top wall of said compressible receptacle arranged under the same and adapted to immerse into said fluid substance in said closed compressible receptacle so as to displace the fluid substance when said top wall is moved downward, raising the level of said fluid substance within said compressible receptacle, closing thereby said one end of said graduated indicating tube and forcing said fluid substance to rise in said graduated indicating tube.

6. A hydraulic scale comprising a closed compressible receptacle forming a closed chamber; a flat horizontal bottom wall forming part of said closed compressible receptacle and serving as support for the same; a flat horizontal top wall forming part of said closed compressible receptacle and serving as scale platform; a compressible side wall extending between said bottom wall and said top wall; a weight graduated indicating tube being secured at one end to said side wall of said compressible receptacle communicating with said closed chamber within the receptacle; a fluid substance arranged within said closed compressible receptacle partly filling said closed chamber within the same so that the level of said fluid substance at no load is slightly under said one end of said tubes secured to said side wall of said compressible receptacle; a noncompressible additional air container combined with said top wall of said compressible receptacle arranged under the same and adapted to immerse into said fluid substance in said closed compressible receptacle so as to displace the fluid substance when said top wall is moved downward, raising the level of said fluid substance within said compressible receptacle, closing thereby said one end of said graduated indicating tube and forcing said fluid substance to rise in said graduated indicating tube; a gaseous substance filling the space above said fluid substance within said closed chamber in said closed compressible receptacle; and a gaseous substance filling said additional gas container and that portion of said graduated indicating tube which is not filled by said fluid substance.

7. A hydraulic scale comprising a closed compressible receptacle forming a closed chamber; a base supporting said closed compressible receptacle; a scale platform supported in horizontal position by said closed compressible receptacle; a graduated weight indicating tube having open ends and one end portion thereof secured to said scale platform so as to project downwardly into said closed chamber within said closed compressible receptacle communicating with said closed chamber; a liquid in said closed compressible receptacle partly filling said closed chamber within the receptacle so that the level of said liquid at no load is slightly under the open bottom end of said end portion of said graduated indicating tube; a displacing member combined with said scale platform and adapted to immerse into said liquid in said closed compressible receptacle so as to displace said liquid when said scale platform is moved downward, raising the level of said liquid, closing thereby said open bottom end of said end portion of said graduated indicating tube and forcing said liquid to rise in said graduated indicating tube; a gaseous substance filling the space above the liquid level of said liquid within said closed chamber; and a gaseous substance within said graduated indicating tube filling that portion of the same which is not filled by said liquid.

8. A hydraulic scale comprising a closed compressible receptacle forming a closed chamber; a flat horizontal bottom wall forming part of said closed compressible receptacle and serving as support for the same; a flat horizontal top wall forming part of said closed compressible receptacle and serving as scale platform; a graduated weight indicating tube having open ends and at its one end portion thereof secured to said top wall of said closed compressible receptacle so as to project through the same downwardly into said closed chamber within said closed compressible receptacle communicating with the chamber; a fluid substance in said closed compressible receptacle partly filling said closed chamber within the receptacle so that the level of said fluid substance at no load is slightly under the open bottom end of said end portion of said graduated indicating tube; a displacing member combined with said flat horizontal top wall of said closed compressible receptacle adapted to immerse into said fluid substance arranged in said closed chamber within said closed compressible receptacle so as to displace the fluid substance when said top wall is moved downward, raising the level of said fluid substance, closing thereby said open bottom end of said end portion of said graduated indicating tube and forcing said fluid substance to rise in said graduated indicating tube; a gaseous substance filling the space above the fluid level of said fluid substance within said closed chamber in said closed compressible receptacle; and a gaseous substance within said graduated indicating tube filling that portion of the same which is not filled by said fluid substance.

9. A hydraulic scale comprising in combination, a closed compressible receptacle forming a closed chamber; a weight indicating tube secured at one end to said closed compressible receptacle communicating with said closed chamber within said receptacle; a liquid substance arranged in said closed chamber within said closed compressible receptacle and filling at least partly said closed chamber; a first quantity of a gaseous substance arranged within said indicating tube; and a second quantity of said gaseous substance being arranged within said closed chamber and being in pressure exchanging relation with said liquid substance, whereby, when the weight is acting on said compressible receptacle, part of said liquid substance is transferred from said closed chamber to said weight indicating tube so that the weight acting on said compressible receptacle can be ascertained from the level of said liquid substance in said weight indicating tube.

10. A hydraulic scale comprising in combination, a closed compressible receptacle forming a closed chamber; a weight indicating tube secured at one end to said closed compressible receptacle communicating with said closed chamber within said receptacle; a liquid substance in said closed chamber within said closed compressible receptacle filling at least partly said closed chamber and reaching into said indicating tube partly filling the same; a first quantity of a gaseous substance arranged within the unfilled part of said indicating tube; a compressible expandable container arranged in said liquid substance within said closed compressible receptacle; and a second quantity of said gaseous substance arranged in said compressible expandable container, said expandable container having the same volume as the unfilled part of said indicating tube when said expandable container is filled with said second quantity of said gaseous substance.

11. A hydraulic scale comprising in combination, a closed compressible receptacle forming a closed chamber; a weight indicating tube secured at one end to said closed compressible receptacle communicating with said closed chamber within said receptacle; a closed container arranged at the other end of said indicating tube; a liquid substance in said closed chamber within said closed compressible receptacle filling at least partly said closed chamber and reaching into said indicating tube partly filling the same; a first quantity of a gaseous substance arranged within the unfilled part of said indicating tube and within said closed container; and a second quantity of said gaseous substance being arranged within said closed chamber and being in pressure exchanging relation with said liquid substance.

12. A hydraulic scale comprising in combination, a closed compressible receptacle forming a closed chamber; a weight indicating tube secured at one end to said closed compressible receptacle communicating with said closed chamber within said receptacle, said tube being at least partly curved and having the other end thereof arranged within said closed chamber; a closed container arranged at the other end of said indicating tube; a liquid substance in said closed chamber within said closed compressible receptacle filling at least partly said closed chamber and reaching into said indicating tube partly filling the same; a first quantity of gaseous substance arranged within the unfilled part of said indicating tube and within said closed container; and a second quantity of said gaseous substance being arranged within said closed chamber and being in pressure exchanging relation with said liquid substance.

13. A hydraulic scale comprising in combination, a closed compressible receptacle forming a closed chamber; a weight indicating tube secured at one end to said closed compressible receptacle communicating with said closed chamber within said receptacle, said tube being at least partly curved and having the other end thereof arranged within said closed chamber; a closed container arranged at the other end of said indicating tube; a liquid substance in said closed chamber within said closed compressible receptacle filling at least partly said closed chamber and reaching into said indicating tube partly filling the same; a first quantity of gaseous substance arranged within the unfilled part of said indicating tube and within said closed container; a compressible expandable container arranged in said liquid substance within said closed compressible receptacle; and a second quantity of said gaseous substance arranged in said compressible expandable container, said expandable container having the same volume as the unfilled part of said indicating tube and said closed container when said expandable container is filled with said second quantity of said gaseous substance.

OCTAVIO JOSE ALVAREZ.

REFERENCES CITED

The following references are of record in the file of this patent:

UNITED STATES PATENTS

| Number | Name | Date |
|---|---|---|
| 1,136,633 | Watres | Apr. 20, 1915 |
| 1,507,242 | Meriam | Sept. 2, 1924 |
| 1,524,928 | Hardel et al. | Feb. 3, 1925 |
| 1,898,848 | O'Brien | Feb. 21, 1933 |
| 2,054,579 | Affleck | Sept. 15, 1936 |
| 2,296,237 | Allen | Sept. 15, 1942 |

FOREIGN PATENTS

| Number | Country | Date |
|---|---|---|
| 609,503 | France | May 15, 1926 |